(12) United States Patent
Xiong et al.

(10) Patent No.: US 10,852,139 B2
(45) Date of Patent: Dec. 1, 2020

(54) POSITIONING METHOD, POSITIONING DEVICE, AND ROBOT

(71) Applicant: UBTECH Robotics Corp, Shenzhen (CN)

(72) Inventors: Youjun Xiong, Shenzhen (CN); Longbiao Bai, Shenzhen (CN); Zhichao Liu, Shenzhen (CN); Zhanjia Bi, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 282 days.

(21) Appl. No.: 16/030,843

(22) Filed: Jul. 9, 2018

(65) Prior Publication Data
US 2019/0195631 A1    Jun. 27, 2019

(30) Foreign Application Priority Data
Dec. 22, 2017   (CN) .......................... 2017 1 1401330

(51) Int. Cl.
| | |
|---|---|
| G06F 17/00 | (2019.01) |
| G06F 17/10 | (2006.01) |
| G01C 21/16 | (2006.01) |
| H04W 4/02 | (2018.01) |
| G05B 19/402 | (2006.01) |
| G05D 1/02 | (2020.01) |
| G01C 21/20 | (2006.01) |

(52) U.S. Cl.
CPC ............. *G01C 21/16* (2013.01); *G01C 21/20* (2013.01); *G05B 19/402* (2013.01); *G05D 1/021* (2013.01); *H04W 4/02* (2013.01); *G05B 2219/31081* (2013.01)

(58) Field of Classification Search
None
See application file for complete search history.

(56) References Cited

U.S. PATENT DOCUMENTS

2007/0265741 A1* 11/2007 Oi .......................... G01C 21/12
                                                              701/23
2012/0303176 A1* 11/2012 Wong ..................... G01S 17/89
                                                              701/1

FOREIGN PATENT DOCUMENTS

CN          107167148 A       9/2017

OTHER PUBLICATIONS

"Research of Localization Technology on Indoor Robot Based on EKF", Qing Gan, «China Master's Theses Full-text Database, Information Science and Thecnology», Issue 2, pp. 10-35, Feb. 15, 2015.

* cited by examiner

*Primary Examiner* — Adam D Tissot

(57) ABSTRACT

The present disclosure relates to positioning technology, and particularly to a positioning method a positioning device, and a robot. In which, the method includes: obtaining first location information of the target object at a current moment being predicted by an extended Kalman filter model at a last moment; obtaining second location information of the target object at the current moment being collected by a sensor; predicting third location information of the target object at the current moment through the extended Kalman filter model based on the first location information and the second location information; and determining an error value of the third location information under a preset constraint condition, and correcting the third location information according to the error value to obtain final location information of the target object at the current moment.

14 Claims, 5 Drawing Sheets

POSITIONING METHOD, POSITIONING DEVICE, AND ROBOT

CROSS REFERENCE TO RELATED APPLICATIONS

This application claims priority to Chinese Patent Application No. 201711401330.1, filed Dec. 22, 2017, which is hereby incorporated by reference herein as it set forth in its entirety.

BACKGROUND

1. Technical Field

The present disclosure relates to positioning technology, and particularly to a positioning method a positioning device, and a robot.

2. Description of Related Art

The real-time robot positioning technology is the key to realize robot autonomous navigation, which is of great significance for improving the intelligent level of robots. In the prior art, a variety of positioning methods which can be applied to a robot are provided. Among them, since the positioning methods based on the extended Kalman filter algorithm can predict the position of a robot by integrating to variety of information such as the position, the velocity, and the posture of the robot, which have higher accuracy than the traditional positioning methods such as ultra wideband (UWB) positioning and global positioning system (GPS) positioning.

However, when the positioning methods based on the extended Kalman filter algorithm are used to predict the position of a robot, since the prediction noise as well as the measurement noise of sensors cannot be completely eliminated, there is a certain error between the predicted position information and the actual position information of the robot.

BRIEF DESCRIPTION OF THE DRAWINGS

To describe the technical schemes in the embodiments of the present disclosure more, clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the embodiments of the present disclosure will be described clearly below with reference to the accompanying drawings in the embodiments of the present disclosure. Apparently, the described embodiments are merely part of the embodiments of the present disclosure, but not all of the embodiments. All other embodiments obtained by those skilled in the art based on the embodiments of the present disclosure without creative efforts shall fall within the protection scope of the present disclosure.

It will be understood that, when used in this specification and the appended claims, the terms "including" and "comprising" indicate the presence of stated features, integers, steps, operations, elements and/or components, but do not preclude the presence or addition of one or more other features, integers, steps, operations, elements, components, and/or the assembly thereof It is also to be understood that, the terminology used in the description of the present disclosure is for the purpose of describing particular embodiments only, and is not intended to limit the present disclosure. As used in the description and the appended claims of the present disclosure, the singular forms "a," "an," and "the" are intended to include the plural forms as well, unless the context clearly indicates otherwise.

It should also be further understood that, the term "and/or" used in the description and the appended claims of the present disclosure refers to any combination and all possible combinations of one or more of the associated listed items and includes such combinations.

Figure 1:
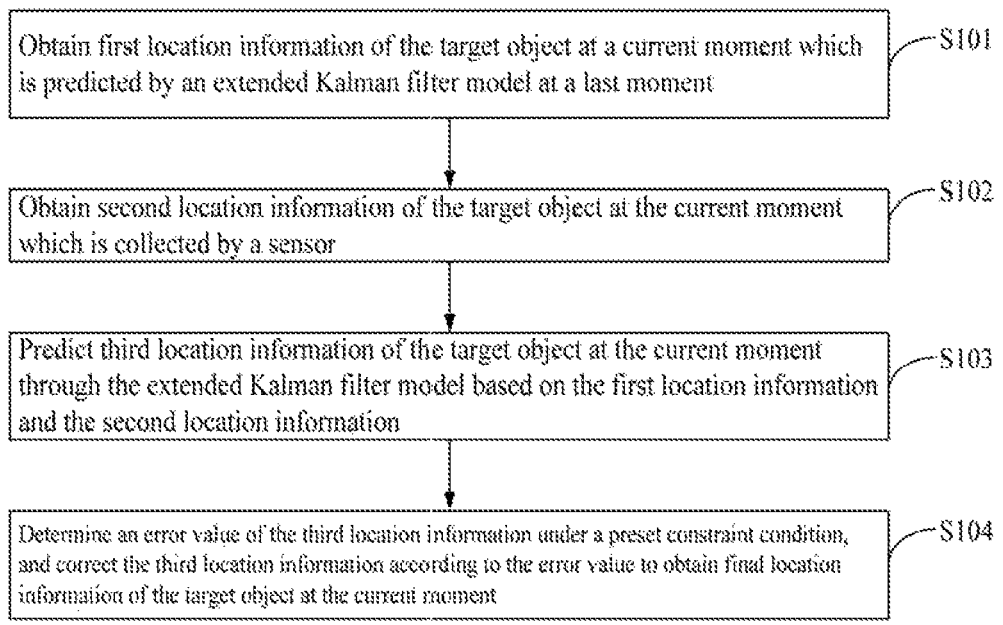
FIG. 1 is a flow chart of an embodiment of a positioning method according to the present disclosure.

FIG. 1 is a flow chart of an embodiment of a positioning method according to the present disclosure. In this embodiment, the execution main body of the positioning method is a positioning device. The positioning device may be disposed in a target object to position the target object. The target object may be a robot. In this embodiment, the method is a computer-implemented method executable for a processor. The method can be applied to a robot, where the robot can be equipped with sensors, such as infrared sensors, ultrasound sensors, or laser sensors. As shown in FIG. 1, the method includes the following steps.

S101: obtaining first location information of the target object at a current moment which is predicted by an extended Kalman filter model at a last moment.

In this embodiment, after the target object receives a positioning instruction, a positioning device is actuated to start positioning. At this time, the positioning device obtains initial location information of the target object. The initial location information is used to describe an initial position state and an initial motion state of the target object at the time of starting positioning.

In this embodiment, the location information may include but is not limited to position information, linear velocity information, linear acceleration information, angular velocity information, declination angle information, and the like. That is, the location information of the target object can be described by multiple parameters such a position, linear velocity, acceleration, angular velocity, and declination angle. Specifically, in this embodiment, the location information is represented by a multidimensional matrix including position information, linear velocity information, linear acceleration information, angular velocity information, and declination angle information.

Specifically, the target object is moved forwardly at a preset distance when receiving the positioning instruction. The positioning device obtains a plurality of position information collected by a positioning sensor disposed in the target object during the movement, and performs a straight line fitting on the position points corresponding to the plurality of position information. The direction of the line obtained by the fitting is determined as an initial velocity direction of the target object, and the position information of the end point of the line obtained by the fitting is determined as initial position information of the target object. In which, the direction of the line obtained by the fitting is directed from the starting point of the line to the end point of the line. The starting point of the line is the position point corresponding to the first position information collected by the positioning sensor during the above-mentioned movement, and the end point a the line is the position point corresponding to the last position information collected h die positioning sensor during the above-mentioned movement.

The preset distance can be determined according to the actual demands, which is not limited herein. For example, the preset distance may be 1 meter. The positioning sensor disposed in the target object may be a positioning sensor based on ultra wideband (UWB) technology, and may also be other types of positioning sensors, which is not limited herein.

The positioning device may use the least square method to perform straight line fitting on the position point(s) corresponding to a plurality of position information, and may also use other methods to perform straight line fitting on the position point(s) corresponding to the plurality of position information.

After obtaining the initial location information of the target object, the positioning device may predict the location information of the target object at the next moment with respect to the time of starting positioning based on the initial location information.

Specifically, after the positioning to the target object is started, the positioning device may obtain the first location information of the target object at the current moment which is predicted through the extended Kalman filter model based on a preset period.

In which, the last moment refers to a moment adjacent to the current moment. For example, if the preset period is 1 second, the positioning device obtains the first location information of the target object at the last moment once for every 1 second. Assume that the time corresponding to the current moment is 10:01, the time corresponding to the last moment is 10:00.

It should be noted that if the current moment is the next moment with respect to the time of starling positioning, the first location information of the target object at the last moment which is obtained by the positioning device is the initial location information of the target object.

S102: obtaining second location information of the target object at the current moment which is collected by a sensor.

After the positioning to the target object is started, the positioning device further obtains the second location information of the target object at the current moment which is collected by the sensor.

In this embodiment, the sensor includes but is not limited to an inertial measurement unit (IMU), an odometer, a positioning sensor, and the like.

In which, the inertial measurement unit is configured to collect the linear acceleration information and the angular velocity information of the target object, the odometer is configured to collect the first position information, the linear velocity information, and the declination angle information of the target object, and the positioning sensor is configured to collect the second position information of the target object.

The first position information is used to identify the coordinates of the target object in a first coordinate system, and the second position information is used to identify the coordinates of the target object in a second coordinate system. The first coordinate system is different from the second coordinate system. Specifically, the first coordinate system may be a coordinate system established in a manner that, the position of the target object at the last moment may be taken as the origin, the direction of the front of the target object at the last moment is taken as the positive direction of the x-axis, and the direction of the right of the target object at the last moment is taken as the the positive direction of the y-axis. The second coordinate system may be a world coordinate system.

In this embodiment, the positioning sensor may be a positioning sensor based on ultra wideband (UMB) positioning technology, or may be a positioning sensor based on global positioning system (GPS), or may also be other types of positioning sensors, which is not limited herein.

S103: predicting third location information of the target object at the current moment through the extended Kalman filter model based on the first location information and the second location information.

After obtaining the first location information and the second location information, the positioning device predicts the third location information of the target object at the current moment through the extended Kalman filter model based on the first location information and the second location information.

In this embodiment, S103 may specifically include the following steps:

calculating the third location information of the target object at the current moment according to a state equation and an observation equation in the extended Kalman filter model based on the first location information and the second location information.

In which the state equation is $x_k = f(x_{k-1}, u_{k-1})$, the observation equation is: $z_k = h(x_k) + v_k$, where, $x_k$ is the third location information, $x_{k-1}$ the first location information, $u_{k-1}$ is a control quantity of preset parameter(s) in parameters for describing location information at the last moment, $f(x,u)$ is a preset ideal state transfer function, $z_k$ is the second location information, $h(x)$ is an ideal state measurement function determined according to attributes of the sensor, $v_k$ is a measurement noise corresponding to each parameter for describing location information at the current moment.

In this embodiment, the dimension of $x_k$ is the same as the dimension of $x_{k-1}$, and both includes the position information, the linear velocity information, the linear acceleration information, the angular velocity information, and the declination angle information of the target object.

The preset parameter(s) can be set according to actual demands, which are not limited herein. For example, the preset parameter may be linear velocity and angular velocity in the location information. The dimension of $u_{k-1}$ is equal to the number of preset parameter(s). For example, $u_{k-1}$ may be a two-dimensional vector for characterizing a linear velocity control amount and an angular velocity control amount. The value of $u_{k-1}$ can be determined according to the motion manner of the target object during the current positioning process. For example, if the motion manner of the target object during the current positioning process is a uniform linear motion, the linear velocity control amount and the angular velocity control amount in $u_{k-1}$ are both 0. Of course, the value of $u_{k-1}$ can also be set by the user, which is not limited herein.

$f(x,u)$ is for characterizing a conversion relationship between the location information of the current moment and the location information of the last moment of the target object, which can be described through a mapping relationship between each parameter in a plurality of parameter for describing the location information and other parameter(s). If the dimension of x is n, the dimension of f(x,u) is n×n. Specifically, f(x,u) can be determined according to the motion manner of the target object during the current positioning process. For example, if the motion manner of the target object during the current positioning process is a uniform linear motion, since the variation of the linear velocity during the uniform linear motion is 0, the mapping relationship of linear velocity information $v_k$ at the next moment and linear velocity information $v_{k-1}$ at the last moment which are included in f(x,u) can be expressed as $v_k = v_{k-1}$.

In this embodiment, the dimension of $z_k$ is the same as the dimension of $x_k$ or the dimension of $x_{k-1}$.

h(x) includes the description of an ideal state measurement function corresponding to each parameter for describing the location information, and the dimension of h(x) is also the same as the dimension of $x_k$ or the dimension of $x_{k-1}$. The ideal state measurement function corresponding to each parameter for describing the location information can be determined according to the attributes of the sensor for measuring the parameter. In practical applications, the ideal state measurement function corresponding to each parameter for describing the location information is usually provided directly by the manufacturer of the sensor.

$v_k$ includes the measurement noise corresponding to each parameter for describing the location information. In practical applications, the measurement noise corresponding to each parameter for describing the location information may be provided directly by the manufacturer of the sensor, or may be artificially estimated, which is not limited herein.

S104: determining an error value of the third location information under a preset constraint condition, and correcting the third location information according to the error value to obtain final location information of the target object at the current moment.

In this embodiment, the preset constraint may be determined according to a constraint equation for characterizing the current motion manner of the target object. The constraint equation for characterizing the current motion manner of the target object is determined according to the motion manner of the target object during the current positioning process. For example, if the motion manner of the target object during the current positioning process is moving forwardly, the constraint equation for characterizing its current motion manner may be y=0, where y is the y-axis coordinate of the target object in the first coordinate system.

The determining the error value of the third location information under the preset constraint condition may specifically be: calculating the error value of the third location information under the preset constraint condition according to the preset constraint condition, the third location information, a weight of each parameter in the location information, and a preset error calculation strategy.

The correcting the third location information according to the error value may specifically be: adding the error value and the third location information to obtain final location information of the target object at the current moment. The current position of the target object is determined according to the position information in the final location information, so as to realize the positioning of the target object.

It should be noted that, the coordinate system which the position information in the third location information or the final location information are based on is a world coordinate system.

As can be seen from the above, the positioning method provided by this embodiment includes: obtaining first location information of the target object at a current moment which is predicted by an extended Kalman filter model at a last moment; obtaining second location information of the target object at the current moment which is collected by a sensor; and predicting third location information of the target object at the current moment through the extended Kalman filter model based on the first location information and the second location information. Since after the third location information of the target object at the current moment is predicted through the extended Kalman filter model based on the first location information and the second location information, the error value of the third location information is determined according to the preset constraint condition corresponding to the constraint equation for characterizing the current motion manner of the target object, and the third location information is corrected according to the error value, the corrected final location information is more accurate, thereby improving the accuracy of positioning.

Figure 2:
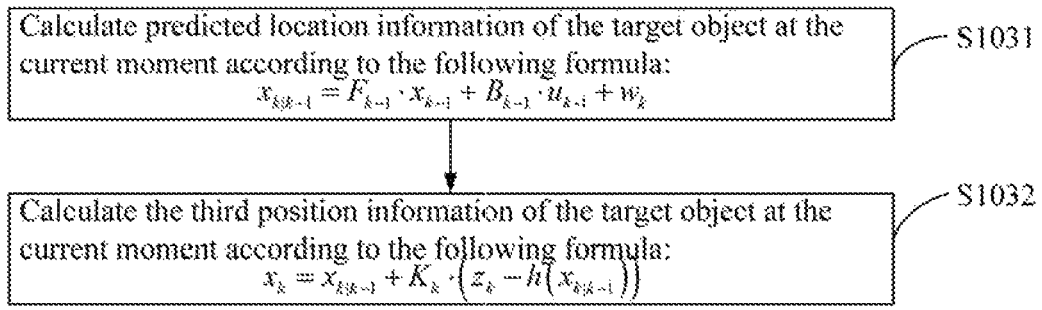
FIG. 2 is a flow chart of an embodiment of S103 in the positioning method of FIG. 1 according to the present disclosure.

FIG. 2 is a flow chart of an embodiment of S103 in the positioning method of FIG. 1 according to the present disclosure. In this embodiment, S103 may be implemented by S1031 and S1032 as shown in FIG. 2. As shown in FIG. 2, the method includes the following steps.

S1031: calculating predicted location information of the target object at the current moment according to the following formula:

$$x_{k|k-1} = F_{k-1} \cdot x_{k-1} + B_{k-1} \cdot u_{k-1} + w_k;$$

where, $x_{k|k-1}$ is the predicted location information of the target object at the current moment, $F_{k-1}$ is an ideal state transition matrix at the last moment, the ideal state transition matrix is a matrix form of the ideal state transfer function $B_{k-1}$ is a control model matrix corresponding to the control quantity $u_{k-1}$, $w_k$ is a process noise at the current moment, and the process noise at the current moment is for characterizing a prediction error when the location information of the target object is predicted at the current moment In this embodiment, the predicted location information $x_{k|k-1}$ of the target object at the current moment is for characterizing the location information of the target object at the current moment which is calculated directly through the state equation in the extended Kalman filter model.

In this embodiment, since, the target object may have different motion manners at different moments, the ideal state transfer function at different moments may be different, and an ideal state transfer rectangle at different moments may be different.

In this embodiment, the product of the dimension of $B_{k-1}$ and the dimensions of $u_{k-1}$ is the same as the dimension of $x_{k-1}$.

In this embodiment, the process noise $w_k$ at the current moment mat be artificially estimated and adjusted.

S1032: calculating the third position information of the target object at the current moment according to the following formula:

$$x_k = x_{k|k-1} + K_k \cdot (z_k - h(x_{k|k-1}));$$

where, $K_k$ is an optimal Kalman gain.

In this embodiment, the optimal Kalman gain can be calculated according to the following formula:

$$K_k = P_{k|k-1} \cdot H_k^T \cdot (H_k \cdot P_{k|k-1} \cdot H_k^T + R_k)^{-1};$$

where, $P_{k|k-1}$ is a covariance matrix of an error which is not updated according to an observation matrix at the current moment. It should be noted that, the error herein refers to an error between the location information of the target object at the current moment which is calculated directly through the state equation in the extended Kalman filter model and the position information of the target object at the current moment which is collected by the sensor.

$H_k$ is the observation matrix at the current moment, which can be calculated according to the following formula: $z_k = H_k \cdot x_k + v_k$.

$H_k^T$ is the transpose matrix of $H_k$, and $R_k$ is a covariance matrix for measuring noise $v_k$.

In this embodiment, the covariance matrix $P_{k|k-1}$ of the error which is not updated according to the observation matrix at the current moment can be calculated by the following formula:

$$P_{k|k-1} = F_{k-1} \cdot P_{k-1|k-1} \cdot F_{k-1}^T + Q_{k-1};$$

where, $P_{k-1|k-1}$ is the covariance matrix of the error updated according to the data collected by the sensor at the last moment, $F_{k-1}^T$ is a transpose matrix of $F_{k-1}$; $Q_{k-1}$ is a covariance matrix of the process noise $w_{k-1}$ at the last moment.

In this embodiment, after the observation matrix $H_k$ at the current moment is determined according to the ideal state measurement function at the current moment, $P_{k|k-1}$ is further updated according to the observation matrix $H_k$ at the current moment, and the covariance matrix $P_{k|k-1}$ of the error after updated according to the observation matrix at the current moment is obtained:

$$P_{k|k} = (I - K_k H_k) \cdot P_{k|k-1};$$

where, I is a unit matrix.

Figure 3:
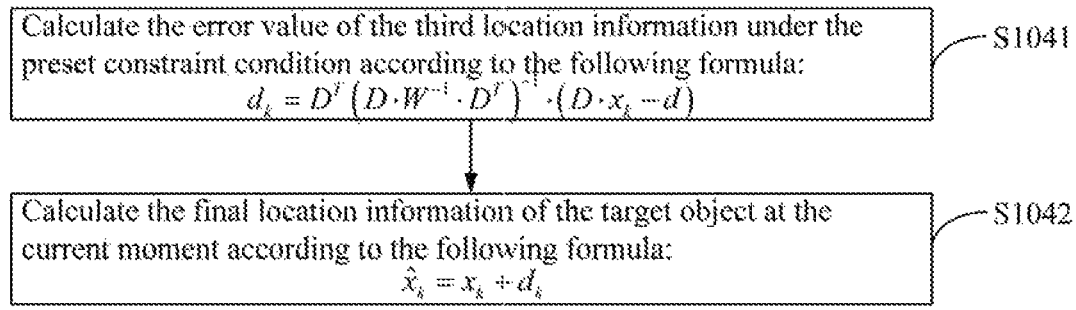
FIG. 3 is a flow chart of an embodiment of S104 in the positioning method of FIG. 1 according to the present disclosure.

FIG. 3 is a flow chart of an embodiment of S104 in the positioning method of FIG. 1 according to the present disclosure. In one embodiment of the present disclosure, S104 may be implemented by S1041 and S1042 as shown in FIG. 3. As shown in FIG. 3, the method includes the following steps.

S1041: calculating the error value of the third location information under the preset constraint condition according to the following formula:

$$d_k = D^T (D \cdot W^{-1} \cdot D^T)^{-1} \cdot (D \cdot x_k - d);$$

where, $d_k$ is the error value of the third location information under the preset constraint condition, D and d constitute constraint conditions of the constraint equation for characterizing the current motion manner of the target object, both D and d are constants, D and d are determined according to the current motion manner of the target object, W is a weight matrix for characterizing the weight of each parameter in the location information, $x_k$ is the third location information.

In this embodiment, the constraint equation for characterizing the current motion manner of the target object may be determined according to a mapping relationship between the motion manner of the target object in the current positioning process and each parameter for describing the location information. Specifically, the constraint equation for characterizing the current motion manner of the target object can be expressed as $D \cdot x = d$, where, x represents predicted location information of the target of at different moments, and D and d constitute constraints of the constraint equation. For example, if the location information is described by linear velocity v, linear acceleration a, and angular acceleration β, the constraint equation for characterizing the motion manner of the target object in the current positioning process is: $2v + 4a - 7\beta = 1$, then D is [2,4,−7] and d is 1.

In this embodiment, the value of W may be determined according to the covariance matrix $P_{k|k}$ of the error updated according to the observation matrix at the current moment. For example, the value of W can be equal to the value of $P_{k|k}$.

S1042: calculating the final location information of the target object at the current moment according to the following formula:

$$\hat{x}_k = x_k + d_k;$$

where, $\hat{x}_k$ is the final location information of the target object at the current moment.

As can be seen from the above, in the positioning method provided in this embodiment, the error value of the third location information is determined according to the preset constraint condition corresponding to the constraint equation for characterizing the current motion manner of the target object, and the third location information is corrected according to the error value, the corrected final location information is more accurate, thereby improving the accuracy of positioning.

Figure 4:
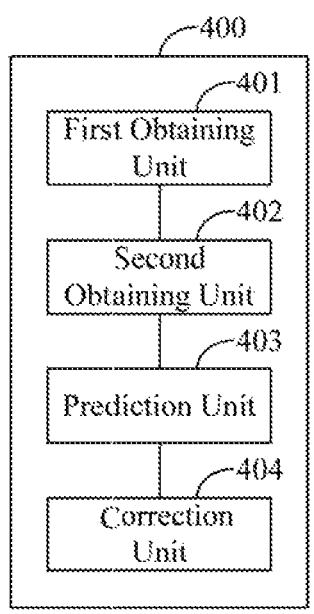
FIG. 4 is a schematic diagram of an embodiment of a positioning device according to the present disclosure.

FIG. 4 is a schematic diagram of an embodiment of a positioning device according to the present disclosure. As shown in FIG. 4, in this embodiment, each unit included in the positioning device 400 is configured to execute each step in the embodiment corresponding to FIG. 1. For specific details, refer to FIG. 1 and the related descriptions in the embodiment corresponding to FIG. 1 which are not described herein. In this embodiment, a positioning device 400 includes a first obtaining unit 401, a second obtaining unit 402, a prediction unit 403, and a correction unit 404.

The first obtaining unit 401 is configured to obtain first location information of the target object at a current moment which is predicted by an extended Kalman filter model at a last moment, in which the last moment is a moment adjacent to the current moment.

The second obtaining unit 402 is configured to obtain second location information of the target object at the current moment which is collected by a sensor.

The prediction unit 403 is configured to predict third location information of the target object at the current moment through the extended Kalman filter model based on the first location information and the second location information.

A correcting unit 404 is configured to determine an error value of the third location information under a preset constraint condition, and correct the third location information according to the error value to obtain final location information of the target object at the current moment, in which the preset constraint condition is determined according to a constraint equation for characterizing a current motion manner of the target object.

Furthermore, the prediction unit 403 is specifically configured to:

calculate the third location information of the target object at the current moment according to a state equation and an observation equation in the extended Kalman filter model based on the first location information and the second location information. In which, the state equation is $x_k = f(x_{k-1}, u_{k-1})$, the observation equation is: $z_k = h(x_k) + v_k$, where, $x_k$ is the third location information, $x_{k-1}$ the first location information, $u_{k-1}$ is a control quantity of a preset parameter in parameters for describing location information at the last moment, $f(x,u)$ is a preset ideal state transfer function, $z_k$ is the second location information, $h(x)$ is an ideal state measurement function determined according to attributes of the sensor, $v_k$ is a measurement noise corresponding to each parameter for describing location information at the current moment.

Furthermore, the prediction unit 403 specifically configured to:

calculate predicted location information of the target object at the current moment according to the following formula:

$$x_{k|k-1} = F_{k-1} \cdot x_{k-1} + B_{k-1} \cdot u_{k-1} + w_k;$$

where, $x_{k|k-1}$ is the predicted location information of the target object at the current moment, $F_{k-1}$ is an ideal state transition matrix at the last moment, the ideal state transition matrix is a matrix form of the ideal state transfer function, $B_{k-1}$ is a control model matrix corresponding to the control quantity $u_{k-1}$, $w_k$, is a process noise at the current moment, and the process noise at the current moment is for characterizing a prediction error of the predicted location information of the target object at the current moment;

calculating the third position information of the target object at the current moment according to the following formula:

$$x_k = x_{k|k-1} + K_k \cdot (z_k - h(x_{k|k-1}))$$

where, $K_k$ is an optimal Kalman gain.

Furthermore, the correction unit 404 is specifically configured to:

calculating the error value of the third location information under the preset constraint condition according to the following formula:

$$d_k = D^T (D \cdot W^{-1} \cdot D^T)^{-1} \cdot (D \cdot x_k - d);$$

where, $d_k$ is the error value of the third location information under the preset constraint condition, D and d constitute constraint conditions of the constraint equation for characterizing the current motion manner of the target object, both D and d are constants, D and d are determined according to the current motion manner of the target object, W is a weight matrix for characterizing the weight of each parameter in the location information, $x_k$ is the third location information;

calculating the final location information of the target object at the current moment according to the following formula:

$$\hat{x}_k = x_k + d_k;$$

where, $\hat{x}_k$ is the final location information of the target object at the current moment.

As can be seen from the above, the positioning device provided by this embodiment performs: obtaining first location information of the target object at a current moment which is predicted by an extended Kalman filter model at a last moment obtaining second location information of the target object at the current moment which is collected by a sensor; and predicting third location information of the target object at the current moment through the extended Kalman filter model based on the first location information and the second location information. Since after the third location information of the target object at the current moment is predicted through the extended Kalman filter model based on the first location information and the second location information, the error value of the third location information is determined according to the preset constraint condition corresponding to the constraint equation for characterizing the current motion manner of the target object, and the third location information is corrected according to the error value, the corrected final location information is more accurate, thereby improving the accuracy of positioning.

Figure 5:
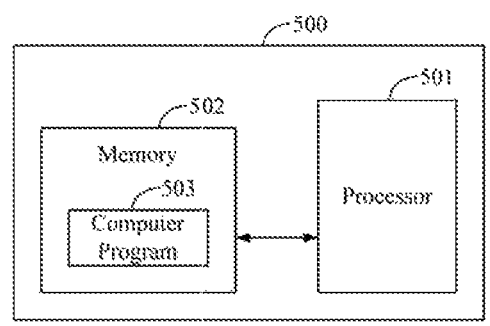
FIG. 5 is a schematic diagram of another embodiment of a positioning device according to the present disclosure.

FIG. 5 is a schematic diagram of another embodiment of a positioning device according to the present disclosure. As shown in FIG. 5, in this embodiment, a positioning device 500 may include a processor 501, a memory 502, and a computer program 503 which is stored in the memory 502 and executed on the processor 501 such as a positioning program. When the processor 501 executes the computer program 503, the steps in each embodiment of the positioning method, for example, S101-S104 shown in FIG. 1, are realized. Alternatively, when the processor 501 executes the computer program 503, the functions of each unit in each embodiment of the above-mentioned device, for example, the units 401-404 shown in FIG. 4, are implemented.

Illustratively, the computer program 503 may be divided into one or more units, and the one or more units are stored in the memory 502 and executed by the processor 501 to realize the present disclosure. The one or more units may be a series of computer program Instruction segments capable of performing a particular function and the instruction segments are used to describe the execution process of the computer program 503 in die positioning device 500. For example, the computer program 503 may be divided into a first obtaining unit, a second obtaining unit, a prediction unit, and a correction unit, and the specific functions of each unit are as follows.

The first obtaining unit is configured to obtain first location information of the target object at a current moment which is predicted by an extended Kalman filter model at a last moment, in which the last moment is a moment adjacent to the current moment.

The second obtaining unit is configured to obtain second location information of the target object at the current moment which is collected by a sensor.

The prediction unit is configured to predict third location information of the target object at the current moment through the extended Kalman filter model based on the first location information and the second location information.

The correction unit is configured to correction unit configured to determine an error value of the third location information under a preset constraint condition, and correct the third location information according to the error value to obtain final location information of the target object at the current moment, in which the preset constraint condition is determined according to a constraint equation for characterizing a current motion manner of the target object.

Furthermore, the prediction unit is specifically configured to:

calculate the third location information of the target object at the current moment according to a state equation and an observation equation in the extended Kalman filter model based on the first location information and the second location information; in which the state equation is $x_k = f(x_k, u_{k-1})$, the observation equation is: $z_k = h(x_k) + v_k$, where, $x_k$ is the third location information, $x_{k-1}$ the first location information, $u_{k-1}$ is a control quantity of a preset parameter in parameters for describing location information at the last moment, $f(x,u)$ is a preset ideal state transfer function, $z_k$ is the second location information, $h(x)$ is an ideal state measurement function determined according to attributes of the sensor, $v_k$ is a measurement noise corresponding to each parameter for describing location information at the current moment.

Furthermore, the prediction unit is further specifically configured to:

calculate predicted location information of the target object at the current moment according to the following formula:

$$x_{k|k-1} = F_{k-1} \cdot x_{k-1} + B_{k-1} \cdot u_{k-1} + w_k;$$

where, $x_{k|k-1}$ is the predicted location information of the target object at the current moment, $F_{k-1}$ is an ideal state transition matrix at the last moment, the ideal state transition matrix is a matrix form of the ideal state transfer function, $B_{k-1}$ is a control model matrix corresponding to the control quantity $u_{k-1}$, $w_k$ is a process noise at the current moment, and the process noise at the current moment is for characterizing a prediction error when the location information of the target object is predicted at the current moment.

calculating the third position information of the target object at the current moment according to the following formula:

$$x_k = x_{k|k-1} + K_{k'}(z_k - h(x_{k|k-1}))$$

where, $K_k$ is an optimal Kalman gain.

Furthermore, the correction unit is specifically configured to:

calculating the error value of the third location information under the preset constraint condition according to the following formula:

$$d_k = D^T (D \cdot W^{-1} \cdot D^T)^{-1} \cdot (D \cdot x_k - d)$$

where, $d_k$ is the error value of the third location information under the preset constraint condition, D and d constitute constraint conditions of the constraint equation for characterizing the current motion manner of the target object, both D and d are constants, D and d are determined according to the current motion manner of the target object, W is a weight matrix for characterizing the weight of each parameter in the location information, $x_k$ is the third location information;

calculation the final location information of the target object at the current moment according to the following formula:

$$\hat{x} = x_k + d_k;$$

where $\hat{x}_k$ is the final location information of the target object at the current moment.

The positioning device 500 may include, but is not limited to, a processor 501 and a memory 502. It can be understood by those skilled in the art that, FIG. 5 is merely an example of the positioning device 500 and does not constitute a limitation on the positioning device 500, and may include more or fewer components than those shown in the figure, or as combination of some components or different components. For example, the positioning device 500 may further is an input/output device, a network access device, a bus, and the like.

The processor 501 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 502 may be an internal storage unit of the positioning device 500, for example, a hard disk or a memory of the positioning device 500. The storage 502 may also be an external storage device of the positioning device 500, for example, a plug-in hard disk, a smart media card (SMC), a secure digital (SD) card, flash card, and the like, which is equipped on positioning device 500. Furthermore, the storage 502 may further include both an internal storage unit and an external storage device, of the positioning device 500. The storage 502 is configured to store the computer program and other programs and data required by the positioning device 500. The storage 502 may also be used to temporarily store data that has been or will be output.

An embodiment of the present disclosure further provides a robot, which it the positioning device in the embodiment corresponding to FIG. 4 or FIG. 5.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to the scope of protection of the present application. For the specific operation process of the units and modules in the above-mentioned device, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplification units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another device, or some of the features may be ignored or not performed. In addition, the shown or discussed mutual coupling may be direct coupling or communication connection, and may also be indirect coupling or communication connection through some interfaces, devices in units, and may also be electrical, mechanical or other forms.

The units described as stearate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form source codes, object codes, executable files, certain intermediate, and the like. The computer-readable medium may include an primitive or device capable of carrying the computer program codes, a recording medium, a US flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be, understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented positioning method for positioning a target object, comprising:
   providing a robot as the target object and a positioning device disposed in the robot, wherein the positioning device comprises a processor and a non-transitory memory electrically coupled to the processor;
   obtaining, by the processor, first location information of the target object at a current moment being predicted by an extended Kalman filter model at a last moment, wherein the last moment is a moment adjacent to the current moment;
   obtaining, by the processor, second location information of the target object at the current moment being collected by a sensor equipped on the target object;
   predicting, by the processor, third location information of the target object at the current moment through the extended Kalman filter model based on the first location information and the second location information; and
   determining, by the processor, an error value of the third location information under a preset constraint condition, correcting the third location information according to the error value to obtain final location information of the target object at the current moment, and storing the final location information of the target object at the current moment in the non-transitory memory, wherein the preset constraint condition is determined according to a constraint equation for characterizing a current motion manner of the target object;
   wherein the predicting, by the processor, the third location information of the target object at the current moment through the extended Kalman filter model based on the first location information and the second location information comprises:
   calculating, by the processor, the third location information of the target object at the current moment according to a state equation and an observation equation in the extended Kalman filter model based on the first location information and the second location information; wherein the state equation is $x_k = f(x_{k-1}, u_{k-1})$, the observation equation is: $z_k = h(x_k) + v_k$, wherein, $x_k$ is the third location information, $x_{k-1}$ the first location information, $u_{k-1}$ is a control quantity of a preset parameter in parameters for describing location information at the last moment, $f(x,u)$ is a preset ideal state transfer function, $z_k$ is the second location information, $h(x)$ is an ideal state measurement function determined according to attributes of the sensor, $v_k$ is a measurement noise corresponding to each parameter for describing location information at the current moment.

2. The method of claim 1, wherein the location information comprises position information, linear velocity information, linear acceleration information, angular velocity information, and declination angle information.

3. The method of claim 1, wherein the calculating, by the processor, the third location information of the target object at the current moment according to the state equation and the observation equation in the extended Kalman filter model based on the first location information and the second location information comprises:
   calculating, by the processor, predicted location information of the target object at the current moment according to the following formula:

$$x_{k|k-1} = F_{k-1} \cdot x_{k-1} + B_{k-1} \cdot u_{k-1} + w_k;$$

where, $x_{k|k-1}$ is the predicted location information of the target object at the current moment, $F_{k-1}$ is an ideal state transition matrix at the last moment, the ideal state transition matrix is a matrix form of the ideal state transfer function, $B_{k-1}$ is a control model matrix corresponding to the control quantity $u_{k-1}$, $W_k$ is a process noise at the current moment, and the process noise at the current moment is for characterizing a prediction error when the location information of the target object is predicted at the current moment;
   calculating, by the processor, the third position information of the target object at the current moment according to the following formula:

$$x_k = x_{k|k-1} + K_k \cdot (z_k - h(x_{k|k-1}))$$

where, $K_k$ is an optimal Kalman gain.

4. The method of claim 1, wherein the determining, by the processor, the error value of the third location information under the preset constraint condition, and correcting the third location information according to the error value to obtain the final location information of the target object at the current moment comprises:

calculating, by the processor, the error value of the third location information under the preset constraint condition according to the following formula:

$$d_k = D^T(D \cdot W^{-1} \cdot D^T)^{-1} \cdot (D \cdot x_k - d);$$

where, $d_k$ is the error value of the third location information under the preset constraint condition, D and d constitute constraint conditions of the constraint equation for characterizing the current motion manner of the target object, both D and d are constants, D and d are determined according to the current motion manner of the target object, W is a weight matrix for characterizing the weight of each parameter in the location information, $x_k$ is the third location information;

calculating, by the processor, the final location information of the target object at the current moment according to the following formula:

$$\hat{x}_k = x_k + d_k;$$

where, $\hat{x}_k$ is the final location information of the target object at the current moment.

5. A positioning device for positioning a target object, comprising:
a first obtaining unit configured to obtain first location information of the target object at a current moment being predicted by an extended Kalman filter model at a last moment, wherein the last moment is a moment adjacent to the current moment;
a second obtaining unit configured to obtain second location information of the target object at the current moment being collected by a sensor;
a prediction unit configured to predict third location information of the target object at the current moment through the extended Kalman filter model based on the first location information and the second location information; and
a correction unit configured to determine an error value of the third location information under a preset constraint condition, and correct the third location information according to the error value to obtain final location information of the target object at the current moment, wherein the preset constraint condition is determined according to a constraint equation for characterizing a current motion manner of the target object;
wherein the prediction unit is specifically configured to:
calculate the third location information of the target object at the current moment according to a state equation and an observation equation in the extended Kalman filter model based on the first location information and the second location information; wherein the state equation is $x_k = f(x_{k-1}, u_{k-1})$, the observation equation is: $z_k = h(x_k) + v_k$, where, $x_k$ is the third location information, $x_{k-1}$ the first location information, $u_{k-1}$ is a control quantity of a preset parameter in parameters for describing location information at the last moment, f(x,u) is a preset ideal state transfer function, $z_k$ is the second location information, h(x) is an ideal state measurement function determined according to attributes of the sensor, $v_k$ is a measurement noise corresponding to each parameter for describing location information at the current moment.

6. The device of claim 5, wherein the prediction unit is specifically configured to:
calculate predicted location information of the target object at the current moment according to the following formula:

$$x_{k|k-1} = F_{k-1} \cdot x_{k-1} + B_{k-1} \cdot u_{k-1} + w_k;$$

where, $x_{k|k-1}$ is the predicted location information of the target object at the current moment, $F_{k-1}$ is an ideal state transition matrix at the last moment, the ideal state transition matrix is a matrix form of the ideal state transfer function $B_{k-1}$ is a control model matrix corresponding to the control quantity $u_{k-1}$, $w_k$ is a process noise at the current moment, and the process noise at the current moment is for characterizing a prediction error when the location information of the target object is predicted at the current moment;
calculate the third position information of the target object at the current moment according to the following formula:

$$x_k = x_{k|k-1} + K_k \cdot (z_k - h(x_{k|k-1}));$$

where, $K_k$ is an optimal Kalman gain.

7. The device of claim 5, wherein the correction unit is specifically configured to:
calculate the error value of the third location information under the preset constraint condition according to the following formula:

$$d_k = D^T(D \cdot W^{-1} \cdot D^T)^{-1} \cdot (D \cdot x_k - d);$$

wherein, $d_k$ is the error value of the third location information under the preset constraint condition, D and d constitute constraint conditions of the constraint equation for characterizing the current motion manner of the target object, both D and d are constants, D and d are determined according to the current motion manner of the target object, W is a weight matrix for characterizing the weight of each parameter in the location information, $x_k$ is the third location information;
calculate the final location information of the target object at the current moment according to the following formula:

$$\hat{x}_k = x_k + d_k;$$

where, the final location information of the target object at the current moment.

8. A robot, wherein the robot comprises a positioning device for positioning the robot, the positioning device comprises:
a first obtaining unit configured to obtain first location information of the robot at a current moment being predicted by an extended Kalman filter model at a last moment, wherein the last moment is a moment adjacent to the current moment;
a second obtaining unit configured to obtain second location information of the robot at the current moment being collected by a sensor;
a prediction unit configured to predict third location information of the robot at the current moment through the extended Kalman filter model based on the first location information and the second location information; and
a correction unit configured to determine an error value of the third location information under a preset constraint condition, and correct the third location information according to the error value to obtain final location information of the robot at the current moment, wherein the preset constraint condition is determined according to a constraint equation for characterizing a current motion manner of the robot;
wherein the prediction unit is specifically configured to:
calculate the third location information of the target object at the current moment according to a state equation and an observation equation in the extended Kalman filter model based on the first location information and the second location information; wherein the state equation is $x_k=f(x_{k-1},u_{k-1})$, the observation equation is: $z_k=h(x_k)+v_k$, where, $x_k$ is the third location information, $x_{k-1}$ the first location information, $u_{k-1}$ is a control quantity of a preset parameter in parameters for describing location information at the last moment, $f(x,u)$ is a preset ideal state transfer function, $z_k$ is the second location information, $h(x)$ is an ideal state measurement function determined according to attributes of the sensor, $v_k$ is a measurement noise corresponding to each parameter for describing location information at the current moment.

9. The robot of claim 8, wherein the prediction unit is specifically configured to:
calculate predicted location information of the target object at the current moment according to the following formula:

$$x_{k|k-1}=F_{k-1}\cdot x_{k-1}+B_{k-1}\cdot u_{k-1}+w_k;$$

where, $x_{k|k-1}$ is the predicted location information of the target object at the current moment, $F_{k-1}$ is an ideal state transition matrix at the last moment, the ideal state transition matrix is a matrix form of the ideal state transfer function $B_{k-1}$ is a control model matrix corresponding to the control quantity $u_{k-1}$, $w_k$ is a process noise at the current moment, and the process noise at the current moment is for characterizing a prediction error when the location information of the target object is predicted at the current moment;

calculate the third position information of the target object at the current moment according to the following formula:

$$x_k=x_{k|k-1}+K_k\cdot(z_k-h(x_{k|k-1}));$$

where, $K_k$ is an optimal Kalman gain.

10. The robot of claim 8, wherein the correction unit is specifically configured to:
calculate the error value of the third location information under the preset constraint condition according to the following formula:

$$d_k=D^T(D\cdot W^{-1}\cdot D^T)^{-1}\cdot(D\cdot x_k-d);$$

wherein, $d_k$ is the error value of the third location information under the preset constraint condition, D and d constitute constraint conditions of the constraint equation for characterizing the current motion manner of the target object, both D and d are constants, D and d are determined according to the current motion manner of the target object, W is a weight matrix for characterizing the weight of each parameter in the location information, $x_k$ is the third location information;

calculate the final location information of the target object at the current moment according to the following formula:

$$\hat{x}_k=x_k+d_k;$$

where, the final location information of the target object at the current moment.

11. The method of claim 1, wherein before the step of obtaining, by the processor, the first location information of the target object at the current moment being predicted by the extended Kalman filter model at the last moment, further comprises:
starting, by the processor, positioning after the target object receives a positioning instruction, and obtaining, by the processor, initial location information of the target object, wherein the initial location information of the target object is used to describe an initial position state and an initial motion state of the target object at time of starting positioning; and
predicting, by the processor, location information of the target object at a next moment with respect to the time of starting positioning based on the initial location information of the target object.

12. The method of claim 11, wherein the step of obtaining, by the processor, the initial location information of the target object, comprises:
obtaining, by the processor, a plurality of position information collected by a positioning sensor disposed in the target object, when the target object moves forwardly at a preset distance according to a received positioning instruction, and performing a straight line fitting on position points corresponding to the plurality of position information; and
determining, by the processor, direction of a line obtained by the straight line fitting as an initial velocity direction of the target object, and determining position information of an end point of the line as initial position information of the target object.

13. The method of claim 12, wherein the direction of the line is directed from a starting point of the line to the end point of the line, the starting point of the line is a position point corresponding to first position information collected by the positioning sensor during target object movement, and the end point of the line is a position point corresponding to last position information collected by the positioning sensor during the target object movement.

14. The method of claim 1, wherein the sensor comprises an inertial measurement unit, an odometer, and a positioning sensor.

* * * * *